(12) United States Patent
Long (10) Patent No.: US 8,905,245 B2
(45) Date of Patent: Dec. 9, 2014

(54) FREE-STANDING BICYCLE PARKING RACK THAT ACCOMMODATES DISC BRAKE EQUIPPED BICYCLES

(71) Applicant: Jason Ron Long, Lehi, UT (US)

(72) Inventor: Jason Ron Long, Lehi, UT (US)

(73) Assignee: Wild One Enterprise.LLC, Lehi, UT (US)

( * ) Notice: Subject to any disclaimer, the term of this patent is extended or adjusted under 35 U.S.C. 154(b) by 0 days.

(21) Appl. No.: 13/860,520

(22) Filed: Apr. 10, 2013

(65) Prior Publication Data

US 2013/0264297 A1 Oct. 10, 2013

Related U.S. Application Data

(60) Provisional application No. 61/622,450, filed on Apr. 10, 2012.

(51) Int. Cl.
*A47F 7/00* (2006.01)
*B62H 3/04* (2006.01)

(52) U.S. Cl.
CPC ........................................ *B62H 3/04* (2013.01)
USPC ................................................ 211/20; 211/22

(58) Field of Classification Search
CPC .............. B62H 3/00; B62H 3/04; B62H 3/08; B62H 3/10
USPC ........................ 211/17–24; 224/924; D12/115
See application file for complete search history.

(56) References Cited

U.S. PATENT DOCUMENTS

| | | | | |
|---|---|---|---|---|
| 2,516,260 A | * | 7/1950 | Schildmeier | 414/427 |
| 2,719,632 A | * | 10/1955 | Sill | 211/22 |
| 3,785,500 A | * | 1/1974 | Kennelly | 211/5 |
| 3,923,221 A | * | 12/1975 | Ballinger | 224/493 |
| 6,257,419 B1 | * | 7/2001 | Kamysiak | 211/22 |
| 6,345,750 B1 | * | 2/2002 | McCoy et al. | 224/525 |
| 7,273,197 B1 | * | 9/2007 | Huggins et al. | 248/154 |
| 2002/0125279 A1 | * | 9/2002 | Edgerly et al. | 224/310 |
| 2004/0124159 A1 | * | 7/2004 | West | 211/19 |

\* cited by examiner

*Primary Examiner* — Korie H Chan
(74) *Attorney, Agent, or Firm* — Stoel Rives LLP (57) ABSTRACT

A free-standing bicycle parking rack has multiple bicycle parking stations that accommodates most bicycles, including those equipped with disc brakes. The rack has a generally rectangular base, with two longitudinal tubular members rigidly coupled to two lateral tubular end members. Each parking station includes a pair of generally parallel, spaced-apart, interconnected V-shaped uprights which are affixed to one of the longitudinal members. A straight brace interconnects each of the uprights with the longitudinal member to which it is not directly affixed. Upright pairs can be alternately reversed so that each pair is affixed to the opposite longitudinal member, thereby facilitating parking of bicycles on both sides of the rack. A sliding collar, a tire-securing bracket, and a pair of bungee cords, which are provided for each parking station, enable the front or rear wheel of a bicycle to be securely clamped in place for transport.

7 Claims, 10 Drawing Sheets

FREE-STANDING BICYCLE PARKING RACK THAT ACCOMMODATES DISC BRAKE EQUIPPED BICYCLES

BACKGROUND OF THE INVENTION

1. Field of the Invention

The invention relates generally to bicycle parking racks and, more particularly, to bicycle parking racks which provide sufficient to accommodate disc brake equipped bicycles.

2. History of the Prior Art

Many types of racks and stands have been used for holding bicycles in a parked upright position. A commonly used stand for holding a bicycle in its normal upright position is the kickstand. A kick stand is typically a support bar that is swingably mounted to the frame on the left side of a bicycle. Though some kickstands are welded directly to the chain stays of the frame adjacent the crank spindle and bearing housing portion of the frame (this was a common practice on Arnold-Schwinn bicycles manufactured in Chicago, Ill.), most kickstands are either clamped to the chain stays or bolted to a bracket spanning the chain stays. However, many cyclists—particularly owners of competition road bikes and mountain bikes—opt to not equip their rides with kickstands, in the interest of reducing weight. In addition, because the kickstand mounting clamps have been known to crush the chain stay tubes, may cyclists will not even consider installing a kickstand on their bikes. This is particularly true of bicycles having carbon graphite fiber-reinforced epoxy frames. Although the frames are extremely strong, the tubes will shatter if squeezed with clamps. Thus, owners of bicycles sans kickstands typically park their bikes by either laying them flat on their sides (preferably on grass) or by resting them in an upright position against a wall or the like structure (the preferred technique is resting the rear wheel against a tree trunk or other vertical object). These improvised parking methods often result in damage to the seat, handlebar, handlebar-mounted controls, rear derailleur, and quick-release mechanisms on the wheel axles when a bicycle slides and falls away from the vertical object against which it was resting. Few things are more annoying to an avid cyclist than seeing his prized mount hit the pavement.

Several types of stand-alone racks have been used to hold and store bicycles. Typically, these racks have vertically-oriented, spaced apart pairs of bars or tubs between which a wheel of a bicycle is positioned. However, within the past decade or so, a new development in the design of bicycles has made many of these racks obsolete. Disc brakes have now become standard equipment on many mountain bikes, on many touring road bikes which often are heavily loaded, and on tandem bicycles. The disc brakes are advantageous because the friction pads do not heat up the rim, which can lead to tire failure on steep grades. In addition, disc brakes eliminate wear on the sides of the rims caused by caliper brakes. Modern aluminum alloy rims have a wear groove on each side of the rim. When the wear groove is no longer visible, the rims must be replaced in the interest of safety. On disc brakes, wear is limited to primarily to the replaceable friction pads, as the brake disc or rotor is typically manufactured from wear-resistant steel. Even in the unlikely event that a rider manages to wear out a disc, it is easily and inexpensively replaced without necessitating replacement of other wheel components. The problem with disc brakes, as far as stand alone racks are concerned, is that the disc rotor may prevent the associated bicycle wheel from being properly positioned between the vertically-oriented, spaced-apart bars or tubes. Even if a rider does manage to slide the wheel into the rack so that the outer planar surface of the disc brake rotor is immediately adjacent a vertical bar or tube, the rider risks scratching, bending or otherwise marring the rotor through contact with the bar or tube.

What is needed is a free-standing bike rack having a new design that is compatible with bicycles equipped with disc brakes.

SUMMARY OF THE INVENTION

The present invention provides a free-standing bicycle parking rack having multiple bicycle parking stations that accommodates disc brake equipped bicycles, as well as bicycles equipped with caliper brakes and coaster brakes. In addition, the bicycle parking rack includes a sliding collar, a tire-securing bracket, and a pair of bungee cords that, together, enable the front or rear wheel of a bicycle to be securely clamped in place within the rack during transport in, for example, the bed of a pickup truck. The rack has a rectangular base constructed from tubing. The base includes two longitudinal members rigidly coupled to two lateral end members. A preferred center-to-center distance between the two longitudinal members is deemed to be 10 to 12 inches (25.4 to 30.48 cm). Each bicycle parking station includes a pair of generally parallel, V-shaped uprights—formed from solid rod or tubing—which are affixed to one of the longitudinal members, and which are, themselves, interconnected by a U-shaped section at the tops thereof. A lower portion of each V-shaped upright is disposed in a generally vertical orientation with respect to the base. An upper portion of each V-shaped upright is angled rearward toward the other longitudinal member. A straight brace made of solid rod or tubing interconnects each of the V-shaped uprights with the longitudinal member to which it is not directly affixed, thereby providing strength and rigidity to the structure. Pairs of V-shaped uprights can be alternately reversed so that each pair is affixed to the opposite longitudinal member, thereby facilitating parking of bicycles on both sides of the rack. The rotors of bicycle disc brake systems are typically have diameters within a range of 160 mm to 203 mm. Thus, each straight brace is secured to its respective V-shaped upright at a point sufficiently low to clear a disc brake rotor having a diameter of about 210 mm when the associated bicycle wheel is inserted between the V-shaped members of an upright pair, with the bottom of the bicycle tire resting centered between the two longitudinal members of the base. Some additional clearance is also provided to clear the brake rotor in the event of a flat tire. The sliding collar fits over the looped end of each V-shaped upright pair.

DETAILED DISCLOSURE OF THE INVENTION

The present invention provides a free-standing bicycle parking rack having multiple bicycle parking stations that accommodates disc brake equipped bicycles, as well as bicycles equipped with caliper brakes and coaster brakes. In addition, the bicycle parking rack includes a sliding collar, a tire-securing bracket, and a pair of bungee cords that, together, enable the front or rear wheel of a bicycle to be securely clamped in place within the rack during transport in, for example, the bed of a pickup truck.

Figure 1:
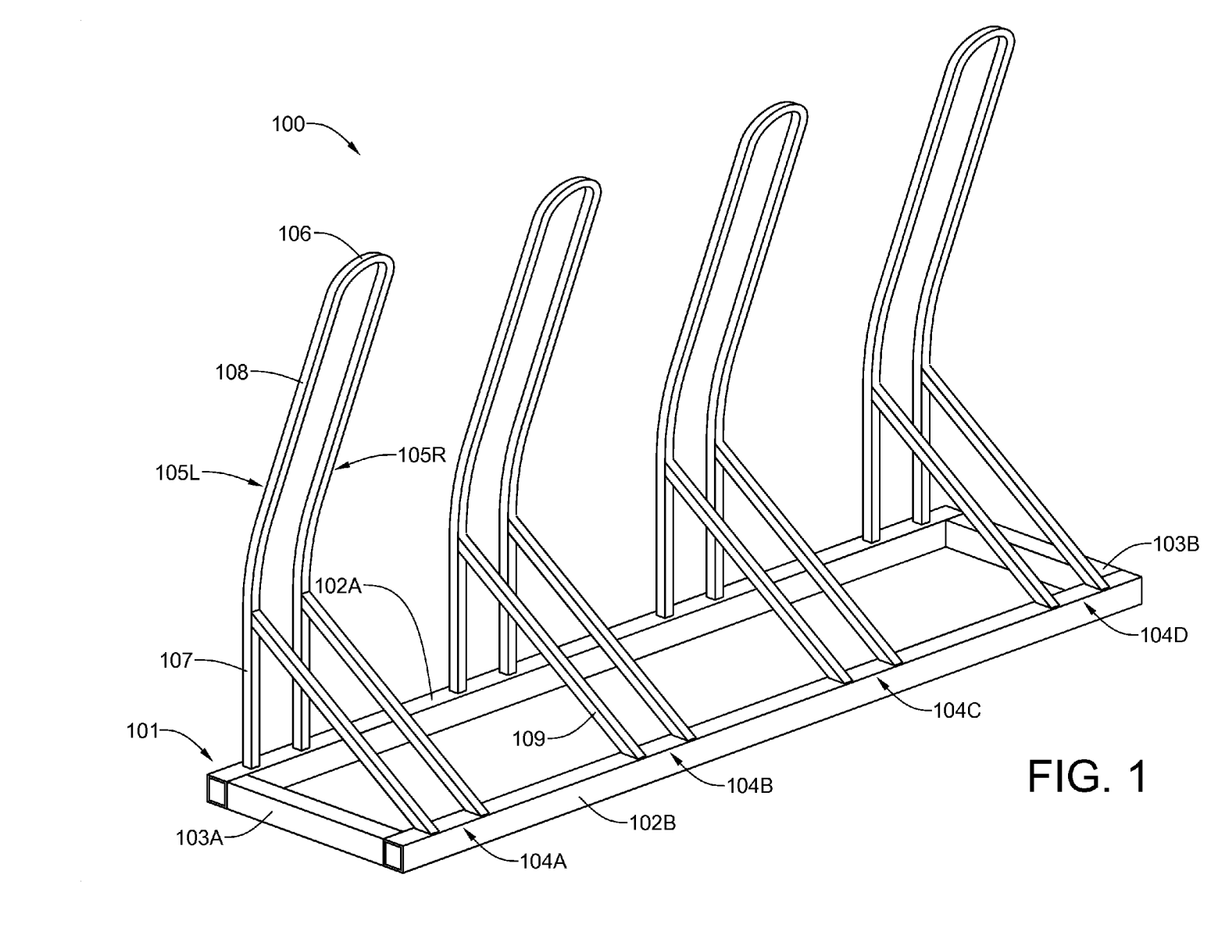
FIG. 1 is an isometric view of a first embodiment, single-sided, free-standing bicycle parking rack.

Referring now to FIG. 1, a first embodiment of the free-standing bicycle parking rack for single-sided parking 100 has a rectangular base 101 constructed from tubing. The base includes two longitudinal members 102A and 102B rigidly coupled to two lateral end members 103A and 103B. A preferred center-to-center distance between the two longitudinal members 103A and 103B is deemed to be 10 to 12 inches (25.4 to 30.48 cm). Each of the four bicycle parking stations 104A, 104B, 104C and 104D includes a pair of generally parallel, shallow-V-shaped uprights 105L and 105R—formed from solid rod or tubing—which are affixed to one of the longitudinal members (in the case if this first embodiment, to longitudinal member 103A), and which are, themselves, interconnected by a U-shaped section 106 at the tops thereof. A lower portion of each V-shaped upright 107 is disposed in a generally vertical orientation with respect to the base. An upper portion of each V-shaped upright 108 is angled rearward toward the other longitudinal member (in the case of this first embodiment, to longitudinal member 103B). A straight brace 109, made of solid rod or tubing, interconnects each of the V-shaped uprights 105L and 106R with the longitudinal member to which it is not directly affixed (in the case of this first embodiment, to longitudinal member 103B), thereby providing strength and rigidity to the structure. As the rotors of bicycle disc brake systems are typically have diameters within a range of 160 mm to 203 mm, each straight brace 109 is secured to its respective V-shaped upright 105L or 105R at a point sufficiently low to clear a disc brake rotor having a diameter of about 210 mm when the associated bicycle wheel is inserted between the V-shaped members 105L and 105R of an upright pair, with the bottom of the bicycle tire resting centered between the two longitudinal members 102A and 102B of the base 101. Some additional vertical clearance is also provided to clear the brake rotor in the event of a flat tire.

Figure 2:
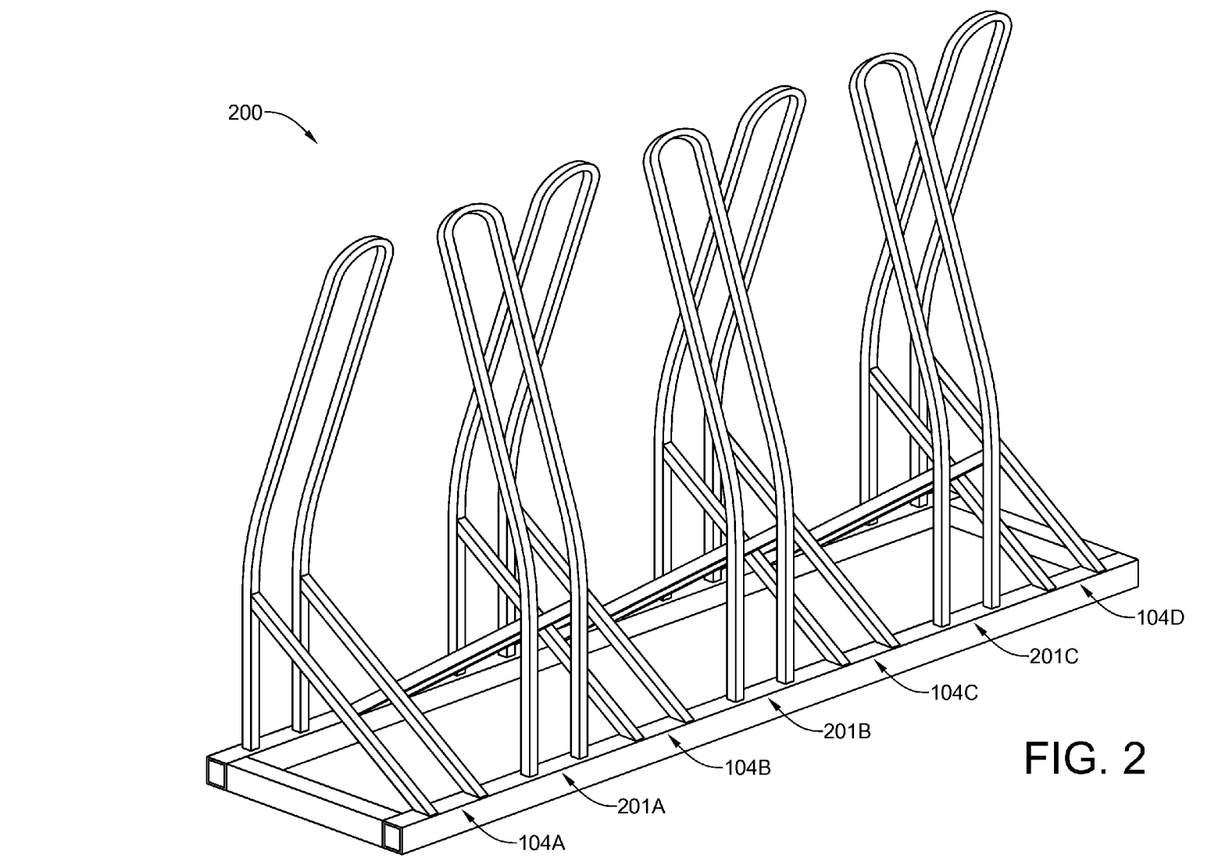
FIG. 2 is an isometric view of a first embodiment, double-sided, free-standing bicycle parking rack.
Figures 3, 5:
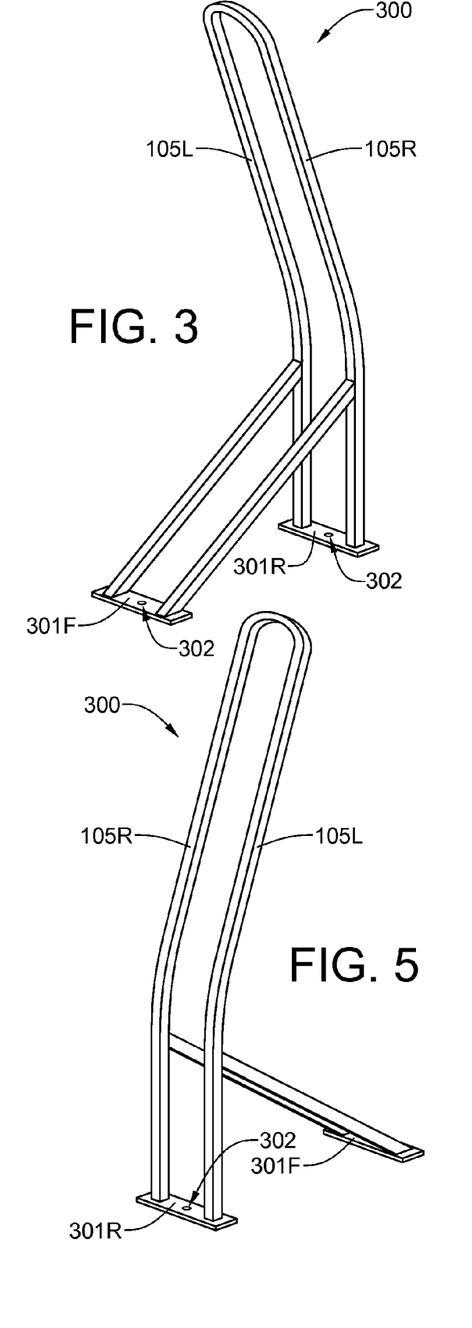
FIG. 3 is a rear/right-side isometric view of an upright and brace assembly.
FIG. 5 is a front/left-side isometric view of an upright and brace assembly.
Figures 4, 6:
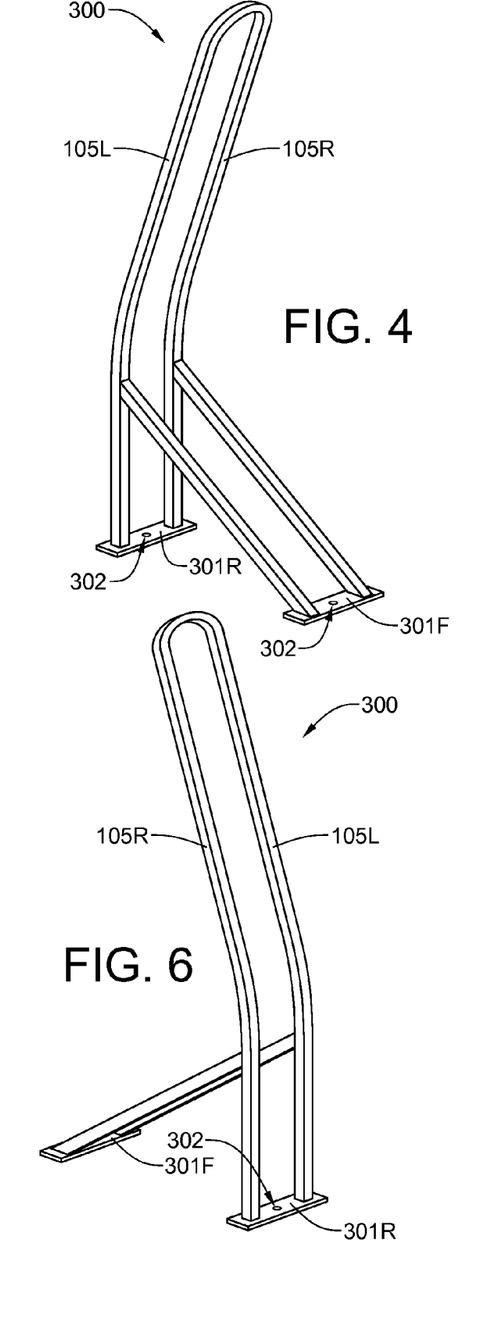
FIG. 4 is a rear/left-side isometric view of an upright and brace assembly.
FIG. 6 is a front/right-side isometric view of an upright and brace assembly.

Referring now to FIG. 2, an enhanced first embodiment free-standing bicycle parking rack for double-sided parking 200 has, in addition to parking stations 104A, 104B, 104C and 104D, three additional parking stations 201A, 201B and 201C, which are inserted between each adjacent pair of the bicycle parking rack 100 of FIG. 1. Each of the three additional parking stations are rotated 180 degrees so that bicycles may be parked on both sides of the rack 200.

Referring now to FIGS. 3 through 6, an upright and brace assembly 300 is shown from four different vantage points. Instead of each shallow-V-shaped upright 105L and 105R and each brace 109 being welded directly to the base 101, they are welded to a rear rectangular mounting plate 301R and a front rectangular mounting plate 301F, respectively. Each mounting plate 301R and 301F have central apertures 302, which will enable them to be bolted to the base.

Figure 7:
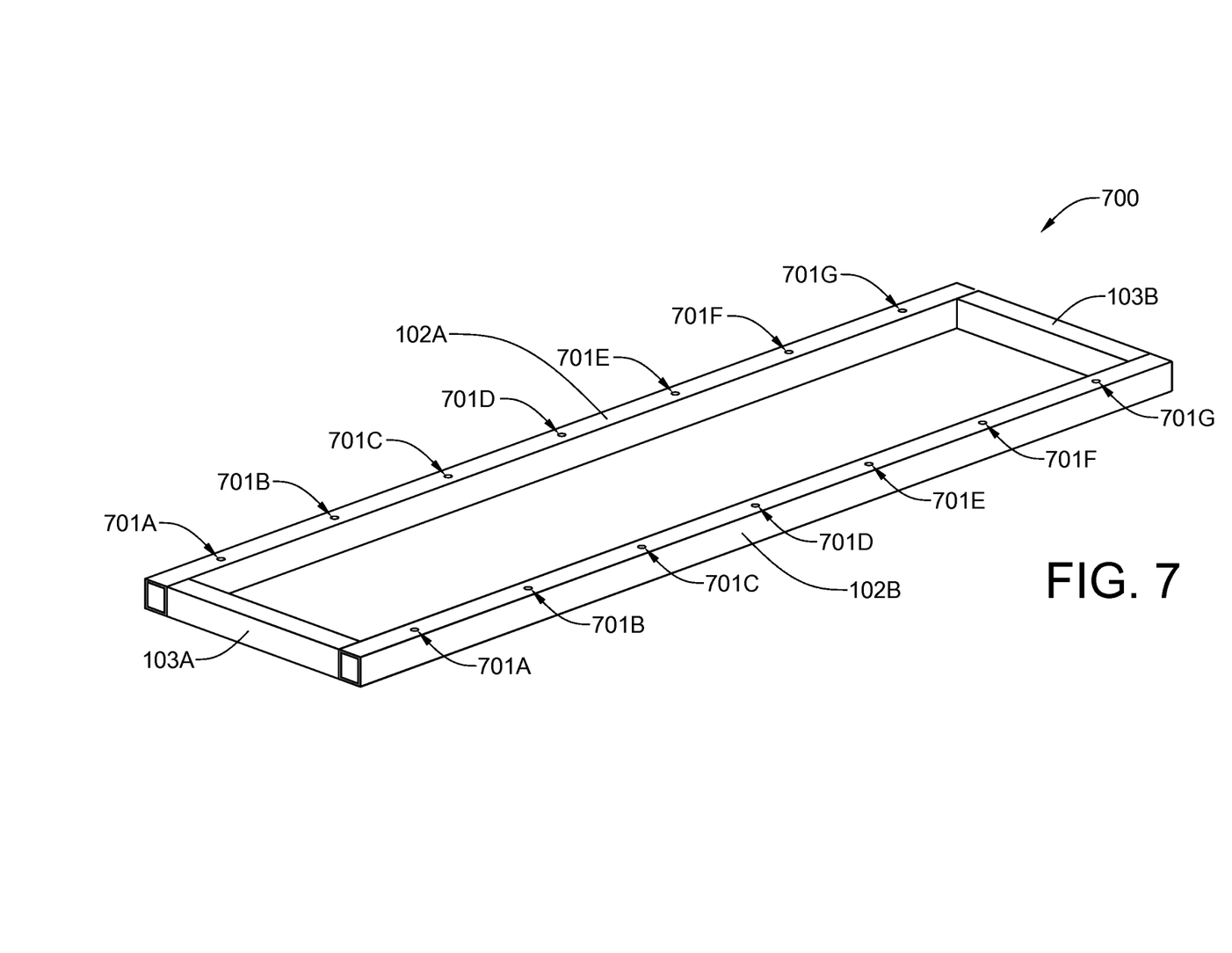
FIG. 7 is a rectangular base assembly for a second embodiment knock-down, free-standing bicycle parking rack.

Referring now to FIG. 7, a rectangular base assembly 700 for a second embodiment knock-down, free-standing bicycle parking rack is shown. The base 300 is constructed from tubing of square cross section. Like the first embodiment base 101, the base 300 includes two longitudinal members 102A and 102B rigidly coupled to two lateral end members 103A and 103B. A preferred center-to-center distance between the two longitudinal members 103A and 103B is deemed to be 10 to 12 inches (25.4 to 30.48 cm). The difference between the base 101 and the base 300 is that seven bolt hole pairs 701A-701G are drilled in the longitudinal members 102A and 102B of the latter. An upright and brace assembly 300 can be bolted to each of opposed bolt holes.

Figure 8:
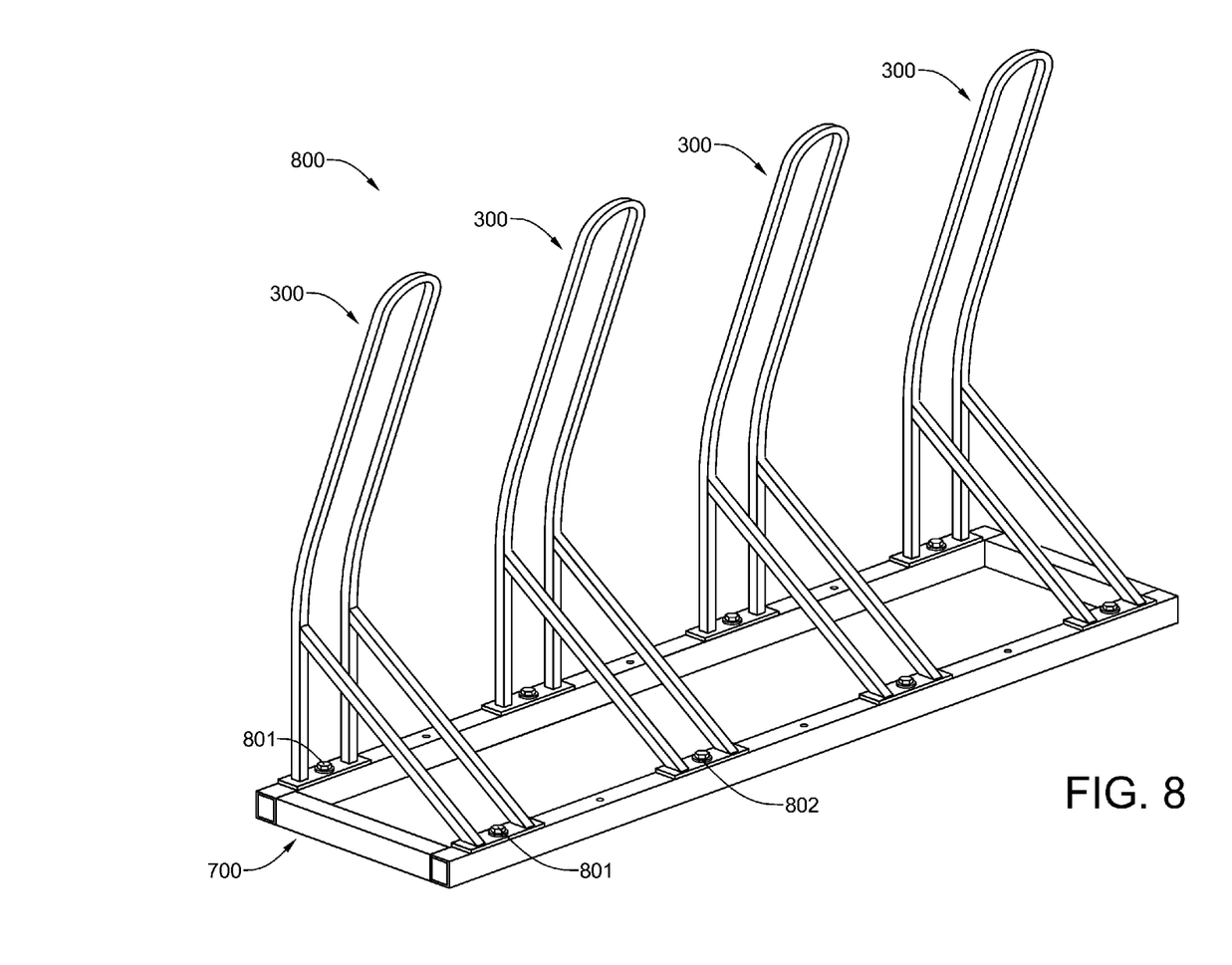
FIG. 8 is an isometric view of a second embodiment, knock-down, single-sided, free-standing bicycle parking rack.

Referring now to FIG. 8, a second embodiment free-standing bicycle parking rack for single-sided parking 800 has been assembled from one base 700 and four upright and brace assemblies 300. Each of the upright and brace assemblies 300 has been bolted to the base 700 with a pair of bolts 801, four plain washers 802, and a pair of locking nuts (two washers beneath the base 700 and the locking nuts are not visible in this view).

Figure 9:
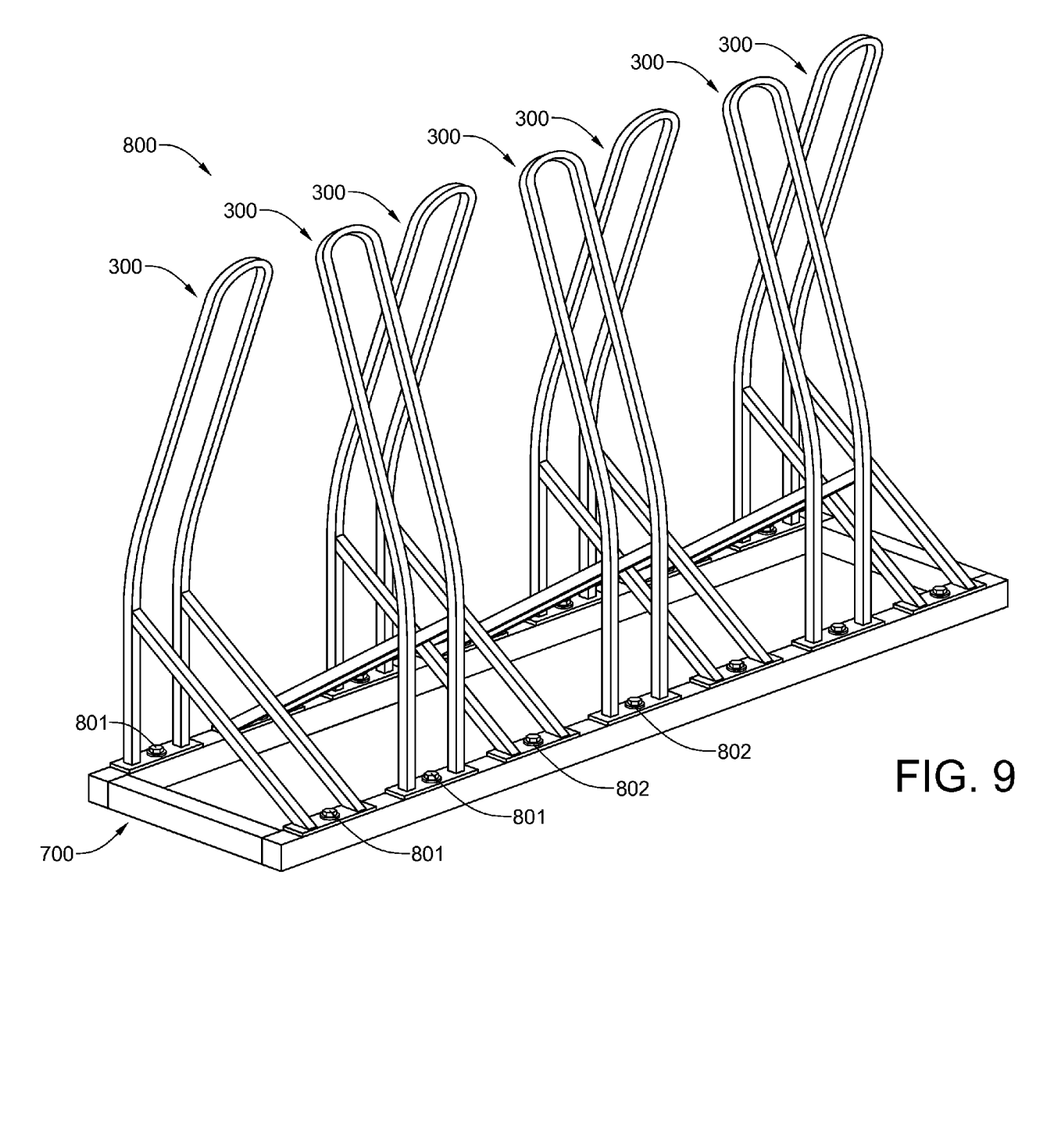
FIG. 9 is an isometric view of a second embodiment, knock-down, double-sided, free-standing bicycle parking rack.

Referring now to FIG. 9, a second embodiment enhance free-standing bicycle parking rack 900 for double-sided parking of bicycles has been assembled from one base 700 and seven upright and brace assemblies 300. Each of the upright and brace assemblies 300 has been bolted to the base 700 with a pair of bolts 801, four plain washers 802, and a pair of locking nuts (two washers beneath the base 700 and the locking nuts are not visible in this view). Each adjacent upright and brace assembly 300 has been reversed with respect to direction in order to implement the double-sided parking feature.

Figure 10:
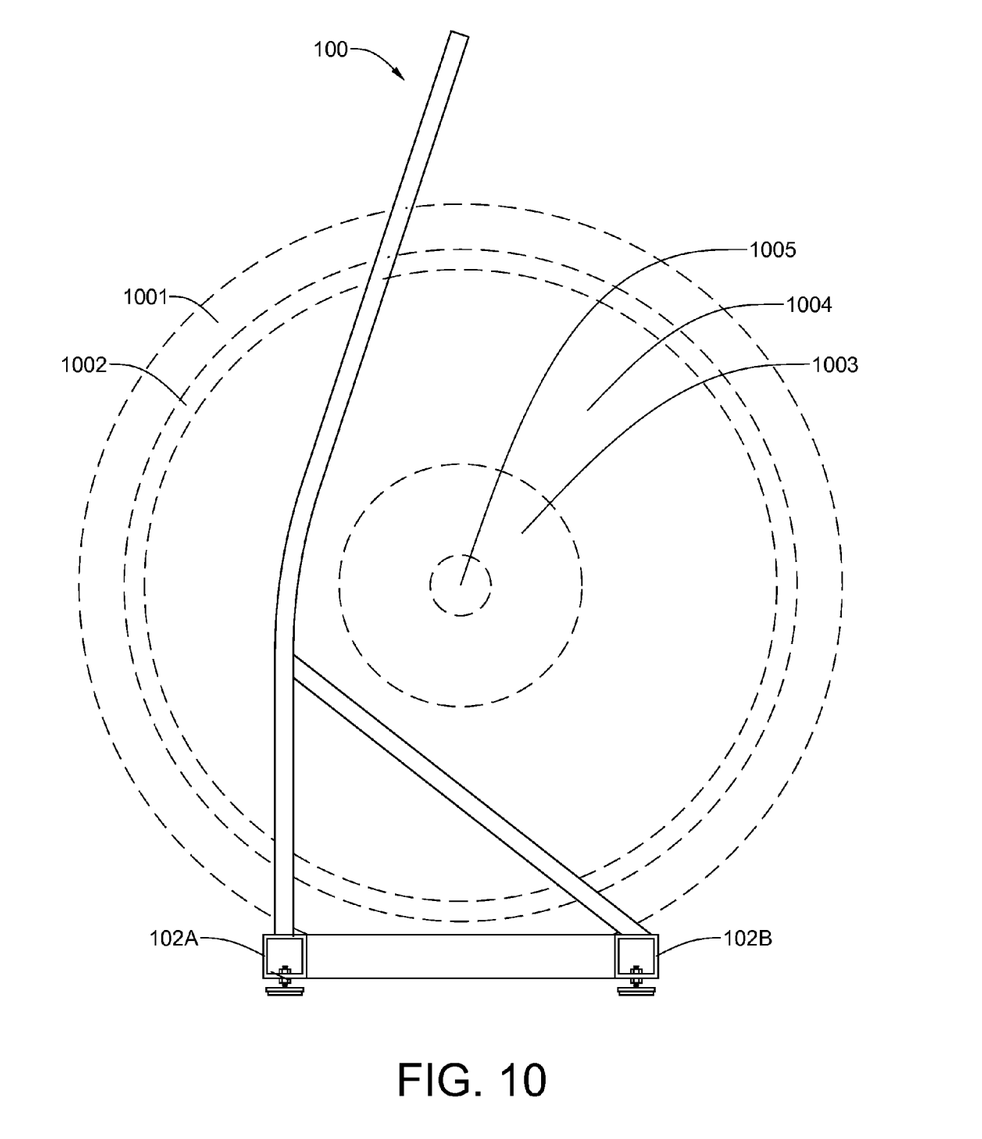
FIG. 10 is a left-side elevational view of the first embodiment, single-sided, free-standing bicycle parking rack.

Referring now to FIG. 10, a first embodiment free-standing bicycle parking rack for single-sided parking 100 is seen in an end view. Features of a disc brake-equipped bicycle wheel 1000 are shown in dashed lines. The tire is represented by the first band 1001; the rim by the second band 1002; and the brake disc by the internal circle 1003. On an actual wheel, the gap 1004 between the brake disc and the rim would be laced with spokes. The axis or axle of the wheel is represented by small circle 1005 near the center of the wheel. In this view, it can be seen how the straight brace 108 is positioned so that it does not contact or otherwise interfere with the disc brake rotor 1003. It will be noted that the axle 1005 of the wheel is generally parallel to each of the longitudinal members 102A and 102B of the base 101. The bicycle tire 1001 rests on both longitudinal members 102A and 102B.

Figure 11:
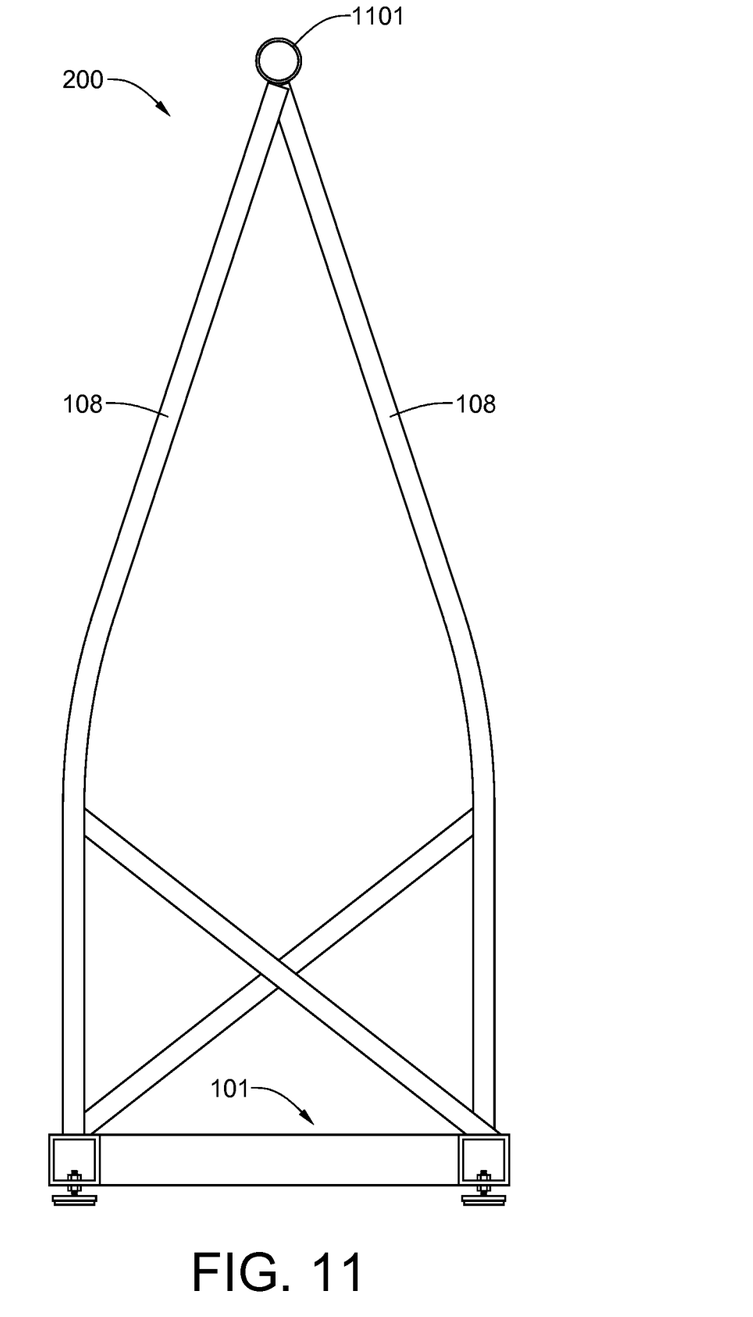
FIG. 11 is a left-side elevational view of the first embodiment, double sided, free-standing bicycle parking rack.

Referring now to FIG. 11, a first embodiment free-standing bicycle parking rack for double-sided parking 200 is seen in an end view. It will be noted that a metal tube 1101 has been welded to the top of each upper portion 108 of each U-shaped section 105R and 105L to increase the structural rigidity of the parking rack 200.

Figure 12:
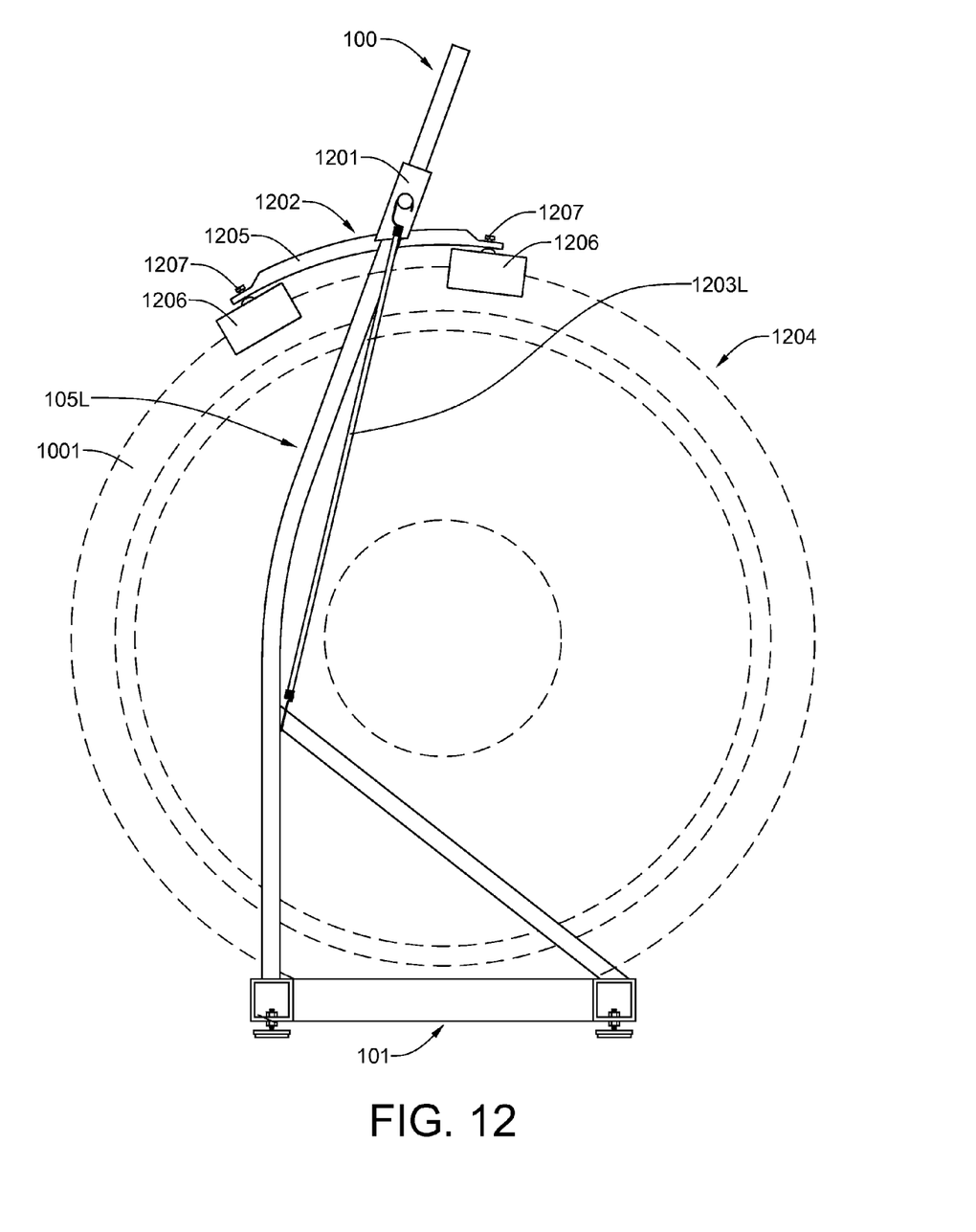
FIG. 12 is a left-side elevational view of a first embodiment free-standing bicycle parking rack, shown in combination with a sliding collar, a tire-securing bracket, and a pair of bungee cords that, together, enable the front or rear wheel of a bicycle to be securely clamped in place within the rack during transport.

Referring now to FIG. 12, a first embodiment free-standing bicycle parking rack 100 has been equipped with a sliding collar 1201, a tire-securing bracket 1202, and a pair of bungee cords 1203L and 1203R (only the left bungee cord 1203L is visible in this view) that, together, enable the front or rear wheel 1204 of a bicycle 200 to be securely clamped in place within the rack 100 during transport in, for example, the bed of a pickup truck. The sliding collar 1201 fits over the looped end of a V-shaped upright pair 104L/104R. The tire-securing bracket 1202 includes a curved backbone 1205 fabricated from a length of channel iron that has been arcuately bent. Each end of the curved member has an aperture through which a tire clamp 1206 is loosely secured with a screw 1207. The bungee cords 1203L and 1203R (not shown in this view) force the sliding collar 1201 against the backbone 1205, which presses each tire clamp 1206 against the tire 1001.

Figure 13:
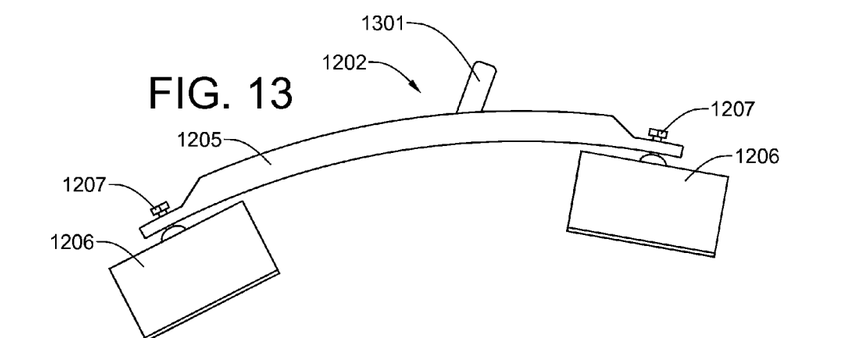
FIG. 13 is a left-side elevational view of the tire-securing bracket.

Referring now to FIG. 13, the tire securing bracket 1202 is shown in an enlarged view. A metal tab 1301, which is centered within and welded to the channel of the backbone 1205, maintains the backbone 1205 in a fixed location with respect to the sliding collar 1201.

Figure 14:
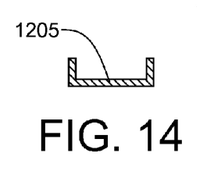
FIG. 14 is a cross-sectional view through an unbent channel iron used to fabricate the backbone of the tire-securing bracket.

Referring now to FIG. 14, a thin slice, cross-sectional view of the backbone 1205 is shown.

Figure 15:
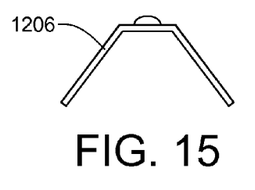
FIG. 15 is a front elevational view of one of a pair of tire clamps employed at opposite ends of the tire-securing bracket.
Figure 16:
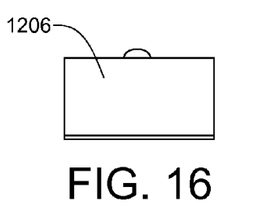
FIG. 16 is a side elevational view of one of a pair of tire clamps employed at opposite ends of the tire-securing bracket.
Figure 17:
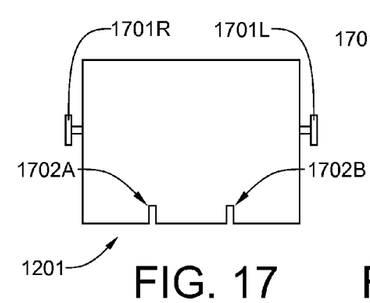
FIG. 17 is a front elevational view of the sliding collar.
Figures 18, 19:
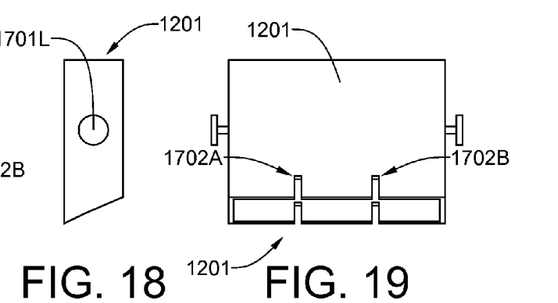
FIG. 18 is a left-side elevational view of the sliding collar (the right-side elevational view being a mirror image thereof)
FIG. 19 is a rear elevational view of the sliding collar.
Figure 20:
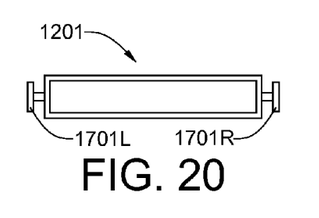
FIG. 20 is a top plan view of the sliding collar.
Figure 21:
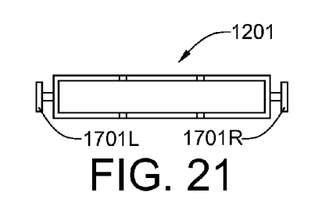
FIG. 21 is a bottom plan view of the sliding collar.

Referring now to FIGS. 15 and 16, a tire clamp 1206 is shown from two different angles. From FIG. 15, it is clear how a tire clamp 1206 is able to fit over and secure a bicycle tire.

Referring now to FIGS. 17 through 21, the sliding collar 1201 has a bungee cord anchors 1701L and 1701R on opposite sides thereof. The bottom end of the sliding collar 1201 has four notches 1702A, 1702B, 1702C and 1702D, which receive the vertical sides of the channel from which the backbone 1205 is fabricated. The notches maintain the backbone 1205 generally perpendicular to the sliding collar 1201 and generally parallel to the tire.

Although only several embodiments of the present invention has been disclosed herein, it will be obvious to those having ordinary skill in the art that changes and modifications may be made thereto without departing from the scope and spirit of the invention as hereinafter claimed.

What is claimed is:

1. A free-standing bicycle parking rack comprising:
a base formed of two longitudinal tubular members rigidly coupled to two lateral tubular members; and
a parking station comprising:
a pair of generally parallel, spaced-apart V-shaped uprights interconnected by a U-shaped member that is continuous with an upper portion of each upright, a bottom portion of both V-shaped uprights rigidly coupled to a first of the two longitudinal tubular members of the base in a manner that a lower portion of both uprights is disposed at an upright orientation relative to the base and that the upper portion of both uprights angles from the lower portion upward and toward a second of the two longitudinal tubular members of the base; and
a pair of generally straight braces, each straight brace of the pair interconnecting one of the uprights with the longitudinal tubular member to which that one of the uprights is not directly affixed;
wherein said V-shaped uprights and said straight braces are positioned such that, when the wheel of a disc-brake-equipped bicycle is positioned between said pair of V-shaped uprights and resting on both longitudinal tubular members, there is clearance between both a front edge of a brake disc affixed to a hub of the wheel and a most proximate V-shaped member and a lower edge of the brake disc and a most proximate straight brace.

2. The free-standing bicycle parking rack of claim 1, further comprising multiple parking stations to accommodate parking of multiple bicycles.

3. The free-standing bicycle parking rack of claim 2, wherein the multiple parking stations are alternately reversed such that the V-shaped uprights of adjacent parking stations are attached to different longitudinal tubular members, thereby facilitating parking of bicycles on both sides of the rack.

4. The free-standing bicycle parking rack of claim 1, wherein the pair of parallel, spaced-apart V-shaped uprights and the associated pair of straight braces are welded directly to said longitudinal tubular members.

5. The free-standing bicycle parking rack of claim 1, wherein the pair of parallel, spaced-apart V-shaped uprights are welded to a separate first bracket that bolts to the first longitudinal tubular member and the associated pair of straight braces are welded to a separate second bracket that bolts to the second longitudinal tubular member.

6. The free-standing bicycle parking rack of claim 1, further comprising a sliding collar that slides over a top portion of the pair of interconnected V-shaped uprights, a tire-securing bracket, and a pair of bungee cords, thereby enabling the front or rear wheel of a bicycle to be securely clamped in place for transport.

7. The free standing bicycle parking rack of claim 1, wherein said base, said V-shaped uprights and said braces are fabricated from mild steel.

* * * * *